Patented Mar. 29, 1932

1,851,376

UNITED STATES PATENT OFFICE

WILLIAM H. SMITH, OF DETROIT, MICHIGAN, ASSIGNOR TO GENERAL REDUCTION CORPORATION, OF DETROIT, MICHIGAN, A CORPORATION OF DELAWARE

TREATING AND RECOVERY OF GANGUE FROM METALS

No Drawing.     Application filed August 12, 1929. Serial No. 385,478.

This invention relates to the treating and recovery of gangue from metals that have been reduced from their natural state, and have associated with them other oxides, known as gangue, not having been reduced to their metallic condition—such as the gangue remaining in iron when reduced to the metallic state without melting.

I have discovered that the gangue contained with reduced metallic oxides after normal reduction process may be treated as plastic gangue, and particularly that the phosphorus in the iron may be neutralized by calcium and silica in such proportions and at such temperatures that the phosphorus combines with such silica and calcium and may be immediately removed or "washed out" from the mass.

The present invention has to do with the treatment of the gangue or unreduced oxides in solution or by fluxing to form water soluble compounds and at temperatures lower than the melting point of the metal, in contrast to the treatment of such oxides or gangue in plastic state and above the melting point of the metal. It has to do particularly with the treatment of silica, phosphorus and sulphur which remain associated with the iron after reduction and before the iron has become molten. It will be understood that the present method has to do particularly with the treatment of gangue remaining in that type of iron known as "sponge iron", which is produced by reducing iron without melting.

It is well known that many iron ores have a percentage from 20-70% iron in their natural state and before reduction, and that after reduction the percentage of iron may vary considerably; say, from 30-95%. The present process is one adapted to the treatment of iron obtained from low percent or poor grade iron ores as well as that of the high percent ores, thus rendering both equally commercial.

In some grades of ore the foreign elements, oxides and gangue, are so finely divided and mechanically associated with the metals as to be inseparable except by melting, but by my process they are all rendered equally separable and valuable.

Silica being the prevailing foreign element in many ores, and especially in the reduced ore, the gist of the present method has to do with the fluxing of this silica to form water soluble compounds, at the same time fluxing and freeing other foreign elements from the metal so as to make them independent. This silica and the remaining oxides in the reduced metal are fluxed by adding compounds of sodium to to reduced metal containing the gangue and subjecting the mixture to temperatures up to and less than the melting point of the reduced metal. Sodium added to the mixture is preferably in the form of a carbonate, or may be converted into a sodium oxide when used in the presence of carbon in the treating process.

To carry out my invention any suitable container may be used that will permit of the application of heat indirectly and permit of the heating together of all of the materials in one bath or in the open hearth to which heat may be applied directly to the mixture of materials used. When sodium in the form of a carbonate is used and applied directly to the mixture of reduced metal and gangue, the ratio of sodium carbonate equals about 2 to 1 of silica, or other oxides present. For example, in the case of iron ore, when heat is applied to this mixture in the proper container, the following reactions take place up to and below the melting point of the iron:

Sponge iron containing gangue reactions with $Na_2CO_3$

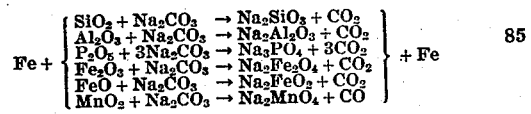

Should carbon be present the reaction would be substantially as follows:

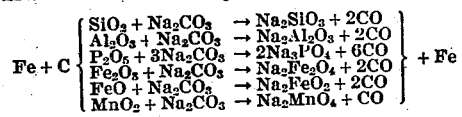

In which case the resulting reactions on the gangue are similar but more rapid.

By this method it is then possible to pour off the greater part of the soluble or fluxed silica and gangue with the sodium; the iron which may have some of the slag still mixed with it can then be placed in boiling water which will dissolve the remaining gangue contained in the sodium compounds. By this method the oxide elements are now independent from the metal and may be washed and freed entirely from same for all practical use.

In the recovery of phosphorus from the liquors the addition of lime may be used to take up the phosphorus as a calcium phosphate. The removal of gangue from reduced chromium and manganese may be carried on in a similar form, the gangue being washed with the addition of water in solution leaving the metal free and of high content.

It will also be understood that any sulphur will be removed as gangue from the reduced metal by the adding of sodium carbonate in the presence of carbon, sulphur as a sulphide being removed as soluble $Na_2SO_4$.

It will thus be seen that by this method I may flux and completely separate any gangue that might be present in metals reduced without melting.

It will be understood that the present process is applicable to the recovery of metals such as chromium, manganese, etc., from their associated oxides or gangue after reduction and before melting of the metal.

It will also be understood that other chemicals of the sodium group may be used, such as potassium, preferably also in the form of a carbonate which reacts with the oxides at temperatures above the melting point of the potassium and below the melting point of the metal, new compounds being made dissolvable or water separable without contamination with the metals.

The first group of reactions above given in connection with the use of sodium carbonate are preferably carried out in a neutral or reducing atmosphere. The second group of reactions, which relate to the use of sodium carbonate plus carbon, are preferably carried out with CO as a reducing gas. Both reductions are similar when potassium is used.

It will be understood that in using the word flux, I mean the adding of one compound to the gangue which is hard to remove and the forming of new compounds with the added compound to render the gangue completely removable from the metal in solution.

What I claim is:

1. The method of treating and recovering gangue from metals reduced from their oxides without melting, which comprises mixing the comparatively cold and finely divided reduced metal with a flux to form water soluble compounds with the gangue and then rendering the compounds separate from the metal.

2. The method of removing foreign elements such as silica from metals reduced from their oxides without melting, which comprises fluxing the silica by adding compounds of the sodium group to the metal and subjecting the mixture to temperatures less than the melting point of the metal.

3. The method of removing and recovering gangue from metals reduced from their ores without melting, which comprises adding sodium to the comparatively cold reduced mixture in the form of sodium carbonate, and applying heat to the mixture whereby the sodium will combine with the gangue to form a water soluble compound.

4. The method of removing and recovering gangue from metals reduced from their ores without melting, which comprises adding sodium to the comparatively cold reduced mixture in the form of sodium carbonate, applying heat to the mixture whereby the sodium will combine with the gangue to form a water soluble compound, pouring off the greater part of the dissolved gangue with the sodium, and then subjecting the metal which may have some of the solution still mixed with it to a liquid for further diluting the gangue whereby the metal may be removed without contamination with the gangue.

5. The method of removing and recovering gangue from metals reduced from their ores without melting, which comprises adding sodium to the mixture in the form of sodium carbonate at temperatures less than the melting point of the metal, whereby the sodium will dissolve the gangue.

6. That step in the removal and recovery of gangue from metals reduced without melting by fluxing said gangue, which comprises accelerating the reaction with the gangue by adding sodium carbonate to the mixture in the presence of carbon.

7. The method of reducing and recovering gangue from metals reduced from their oxides without melting, which comprises adding sodium carbonate to the mixture in the ratio of approximately two parts of sodium carbonate to one part of gangue, and then subjecting the mixture to a temperature less than the melting point of the metal whereby to dissolve the gangue.

8. The method of reducing and recovering gangue from metals reduced from their oxides without melting, which comprises adding sodium carbonate to the mixture in the ratio of approximately two parts of sodium carbonate to one part of gangue, then subjecting the mixture to a temperature less than the melting point of the metal whereby to dissolve the gangue, and washing the dissolved gangue from the metal to leave the same free.

9. The method of removing and recovering gangue from metals reduced from their ores without melting, which comprises adding sodium to the mixture in the form of sodium carbonate, in excess of the amount of gangue and at a temperature less than the melting point of the metal.

10. The method of removing foreign elements such as silica and phosphorus from metals reduced from their ores without melting, which comprises dissolving the silica and phosphorus gangue by adding compounds of sodium to the reduced metal in the presence of temperatures less than the melting point of the metal whereby to dissolve the gangue so as to separate the silica and phosphorus from the metal.

11. The method of removing foreign elements such as silica and sulphur from metals reduced from their ores without melting, which comprises dissolving the silica and sulphur gangue by adding compounds of sodium to the reduced metal in the presence of temperatures less than the melting point of the metal whereby to flux the gangue to form water soluble compounds so as to separate the silica and sulphur from the metal.

12. The method of removing and recovering gangue from metals reduced from their ores without melting, which comprises adding a substance to the reduced metal which will react with the gangue to form a compound which may be made separable from the metal by the adding of water.

13. The method of removing and recovering gangue from metals reduced from their ores without melting, which comprises adding a carbonate of the sodium group to react with the gangue at temperatures above the melting point of the carbonate but below the melting point of the metal whereby the carbonate reacts with the gangue to form new compounds readily separable from the metal.

In testimony whereof I affix my signature.

WILLIAM H. SMITH.